March 26, 1935.   R. A. MONROE   1,995,620
VIBRATION INHIBITOR
Filed July 9, 1932
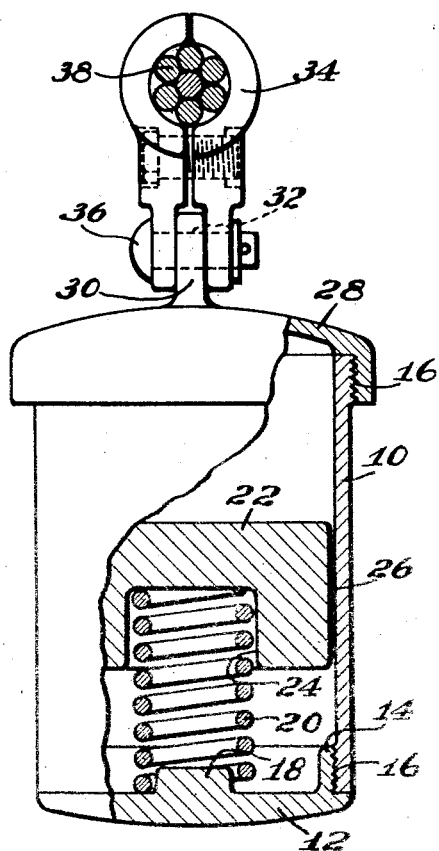
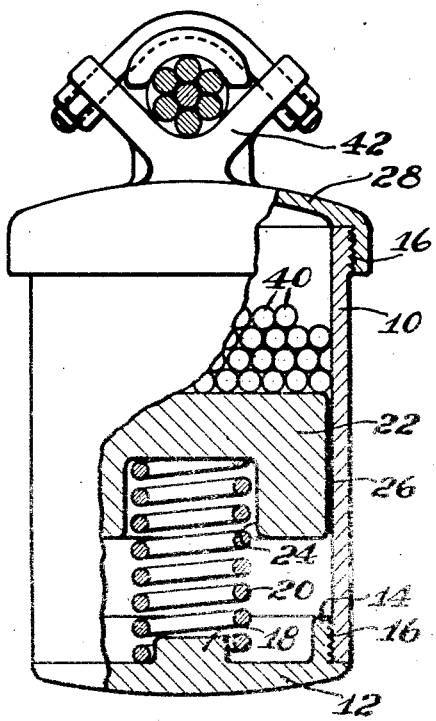
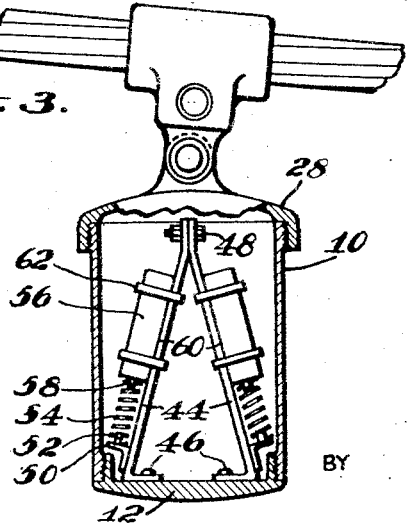
INVENTOR
Robert A. Monroe
BY
ATTORNEY Patented Mar. 26, 1935

1,995,620

UNITED STATES PATENT OFFICE 1,995,620

VIBRATION INHIBITOR

Robert A. Monroe, Mount Lebanon, Pa., assignor to Aluminum Company of America, Pittsburgh, Pa., a corporation of Pennsylvania Application July 9, 1932, Serial No. 621,565

8 Claims. (Cl. 173—13)

The invention relates to vibration inhibitors primarily adapted for use in connection with overhead transmission lines.

While the phenomenon of vibration of overhead conductors is not yet thoroughly understood, the damaging results of vibration are quite generally known and considerable effort has been expended in the direction of inhibiting vibration. Vibration has caused damage to conductors in widely scattered locations throughout the country, and although a very small percentage of the total mileage of transmission lines has been adversely affected, the threat of a shortening of the life of the conductor by vibration has directed attention to the solution of the problem.

Generally speaking, all transmission lines, regardless of material, size of conductor, span length, tension or character of supports, vibrate under certain conditions. The vibration may vary all the way from a slow vertical oscillation of the span, as one loop with an amplitude of several feet which is generally termed "dancing", to the audible high frequency singing of small wire such as is often heard on telephone lines. The dancing or whipping of overhead conductors is quite distinct from the phenomenon of resonant vibration, toward the elimination of which the present invention is primarily directed.

It is well known that a suspended cable can be caused to vibrate in a vertical plane in a series of nodes and loops by the action of a wind blowing transversely to the line. The generally accepted theory explaining this is that air currents moving across the line create periodic eddies on the leeward side of the conductor. These eddies create rapidly alternating condensations and rarefactions which exert minute vertical forces on the conductor. When the period of these eddies coincides with the natural period, or a harmonic, of the elastic conductor, a resonant condition exists and the motion builds up until balanced by internal and external damping influences. The maximum amplitude of vibration rarely exceeds the diameter of the conductor and ordinarily is less. The frequency may vary from a minimum of a few cycles per second for large cables, to an upper limit for small wires which lies within the range of audibility.

Sharp fatigue fractures of wire at insulator ties and other points of support have occurred with all conductor material ever since the beginning of overhead line construction. These failures are generally recognized to be the result of fatigue occasioned by vibration. In the installation of high tension transmission lines, with the growing tendency to increase the length of span and also to increase the tension in the cable, increasing trouble resulting from resonant vibration has been encountered. Long continued vibration may weaken the metal of the cable by fatigue and ultimately lead to rupture at its point of support. The number of cycles or repetitions of stress necessary to reach the fatigue limit of the metal of the cable varies considerably with the type of cable employed. For example, only 10 to 20 million cycles are necessary to reach the fatigue limit for ferrous metals, while in the case of a non-ferrous metal such as aluminum, from 400 to 500 million cycles may be necessary. Experience indicates that the completion of 10 to 20 million cycles of vibration will occur comparatively early in the life of a cable. It is quite manifest that under these conditions the problem of eliminating vibration assumes serious proportions, and it is the solution of this problem to which the present invention is directed.

It is a general object of my invention to provide an improved form of vibration inhibitor which virtually eliminates the vertical vibrations that occur in transmission lines and consequently obviates many of the failures that are attendant upon such vibration. Toward this end the invention broadly contemplates the provision of a resiliently suspended mass or inertia member with means for attaching the same to a cable at some predetermined point intermediate the ends of the span. This resiliently-suspended inertia member is of sufficient weight to offer a considerable amount of resistance to suddenly-applied forces resulting from the tendency of the cable to vibrate in a vertical plane. Associated with the inertia member are frictional means so arranged that extremely minute vibrations represented by relative movement between the cable and the inertia member will develop friction with the consequent absorption of energy from the vibrating line. The inertia member, frictional means, and means of resiliently suspending the same from the cable are contained and embodied in a compact unitary structure protected by its design from adverse weather conditions.

In designing the improved vibration inhibitor consideration has been given to preventing the formation of corona discharge at the point of attachment of the inhibitor. Such consideration has resulted in a design of inhibitor by which the electrostatic flux in the medium surrounding the conductor is not materially disturbed.

The provision of a vibration inhibitor which is of simple, compact and unitary construction and which consequently is unlikely to get out of order, yet one which may be disassembled for the purpose of renewal of its parts or for repair, and one which is extremely efficient in its operation are further desiderata that have been borne in mind in the conception and reduction to practice of the present invention. Further objects and advantages of the invention will become more apparent as the nature of the invention is better understood, and it consists in a novel construction and arrangement of parts shown in the accompanying drawing in which:

Fig. 1 is a side elevation, partly in central vertical section, of an assembled vibration inhibitor constructed in accordance with the principles of the present invention, showing the same secured to a transmission line by suitable clamping means;

Fig. 2 is a view similar to Fig. 1, illustrating a modified form of the invention;

Fig. 3 is a side elevation, partly broken away in central vertical section, showing a further modification.

In the drawing like characters of reference are applied to designate like parts throughout. Referring first to Fig. 1, the vibration inhibitor therein disclosed involves in its general organization a cylindrical casing 10 having a bottom plate 12 provided with a flange 14 adapted for attachment to the lower portion of the casing in any suitable manner, as for example by means of the threaded connection 16. The plate 12 is provided with an internal centrally-located boss 18 which serves to center a coil spring 20 into the lower end of which the boss 18 projects. The coil spring 20 supports an inertia member 22 having a recess 24 into which the upper end of the coil spring 20 extends. The inertia member is preferably formed of a relatively heavy metal or alloy, as for example iron or brass. The diameter of the inertia member is very slightly less than the internal diameter of the casing 10 so that an annular clearance space 26 exists between the inner walls of the casing and the circumferential surface of the inertia member 22. I have found that for a typical installation a clearance 26 on the order of 0.005 inch is satisfactory.

The upper end of the casing 10 is closed by means of a plate 28 secured to the casing 10, as by means of the screw thread connection 16. The closure plate 28 as well as the bottom closure plate 12 is slightly rounded in configuration. This feature, together with the fact that the casing 10 is substantially cylindrical, prevents formation of serious corona discharge as might otherwise be occasioned. The upper closure plate 28 is provided with an upstanding lug 30 having a transverse aperture 32 extending therethrough. A 2-piece separable clamp, designated generally by the reference numeral 34, is attached to the lug 30 as by means of a pin 36, providing suitable means for suspending the vibration inhibitor from the transmission line 38.

In use the device is secured to the cable at some predetermined point intermediate the ends of the span. Usually it is preferable to employ two of the vibration inhibitors, one of which is positioned near each of the insulators or points of suspension. For unusually long spans more than two inhibitors may be required.

The operation of the improved inhibitor disclosed in Fig. 1 is as follows: The casing 10 being rigidly secured to the cable 38 must necessarily move in a vertical direction in unison with the cable at the point of attachment of the casing. Such vertical movement of the casing is effectively damped against the inertia member 22 which, being of considerable mass, resists initial movement vertically. This damping action is effected partially by reason of the clearance between the inertia member and the casing 10 which, as the casing moves up or down relative to the inertia member, allows the air contained within the casing to be forced from one side of the inertia member to the other side through the clearance space 26. The frictional resistance of the air in passing through the space between the walls of the casing and the inertia member results in an absorption of energy which exerts an effective damping action. Although the hysteresis of the spring 20 is extremely small, nevertheless the damping action is further, though slightly, increased by virtue of the energy absorbed by the spring which resists any tendency of the cylinder to move upwardly with respect to the inertia member 22.

In Fig. 2 there is shown a modified form of vibration inhibitor. The details of construction of the casing 10, plate 12, inertia member 22 and compression spring 20 remain substantially the same as in the form of the invention just described in connection with Fig. 1. The presence of lead or steel shot designated at 40, which is contained within the casing 10 in the space above the inertia member 22, is the distinguishing characteristic of this form of the invention. As an equivalent of the shot specifically referred to, sand, gravel and viscous liquid or loose particles contained in liquid, or other loose material that will offer frictional resistance to the vibration of the casing may be employed. Thus, when the transmission line 38 is vibrated vertically the casing, vibrating in unison therewith, and therefore vibrating relative to the inertia member will cause the particles 40 to be rubbed together and against the walls of the casing, producing friction between the particles themselves and between the particles and the walls of the casing, thus serving to absorb the energy of vibration. In actual use I have found that the inhibitor prevents the occurrence of vibration of any appreciable magnitude. The benefits conferred by my invention result from the inhibiting or damping action of the device herein disclosed. The maximum amplitude of vibration is thereby reduced to a point which virtually eliminates fatigue stresses.

A modified form of clamping device 42 is shown in connection with this form of vibration inhibitor. This clamp 42 is characterized by smooth lines which materially aid in preventing the formation of undesirable corona discharge.

Referring now to Fig. 3, wherein a further embodiment of the invention is shown, the casing 10, bottom closure plate 12 and top closure plate 28 are substantially the same as these respective elements in Fig. 1. A pair of inclined plates 44 have their lower ends secured to the closure member 12 as at 46. The upper edges of the plates are secured together at 48 by any suitable means. Each plate 44 is provided with a transversely-extending angle piece 50 adjacent its bottom having a centering projection 52 about which is disposed the lower end of a coil spring 54. A movable inertia member 56 having a centering projection 58 at its lower end is supported on each spring 54. This inertia member is provided with a flat face 60 for frictional engagement with the surface of the respective inclined plate 44. As the casing vibrates in a vertical direction the inertia members 56 tend to remain in their initial position and therefore move with respect to the inclined plates 44, producing friction between the contacting surfaces to absorb the energy of vibration. Suitable means may be provided for guiding the inertia members 56 with respect to the inclined plates 44 and for this purpose I have shown the guiding straps 62.

In the interest of clarity I have described my invention with reference to particular embodiments and have employed specific language. In the use of such language I have no intention of excluding any equivalents or minor variations of the invention set forth.

What I claim is:

1. In a vibration inhibitor for transmission lines, a casing member adapted to be attached to a cable span, said casing member having a detachable base member, an inertia member within said casing, said inertia member being positioned on and removable with said detachable base member.

2. In a vibration inhibitor for transmission lines, a cylindrical casing member adapted to be attached to a cable span, said casing member having a detachable base member, an inertia member slidably mounted within said casing, said inertia member being resiliently supported on said detachable base and removable therewith.

3. In a vibration inhibitor for transmission lines, a cylindrical casing member adapted to be attached to a cable span, said casing member having a detachable base member, an inertia member slidably received within said casing and provided with a centrally located recess, a coil spring having one of its ends positioned within said recess, a boss extending upwardly from said base member, said boss being positioned within the other end of said coil spring, said coil spring and inertia member being removable as a unit on and with the removal of the detachable base member.

4. In a vibration inhibitor for transmission lines, a cylindrical casing member having removable top and base members, said top and base members having rounded configurations so as to eliminate corona discharge, means associated with the top member for attaching the casing to a cable span, an inertia member within said cylindrical casing, said inertia member being slightly smaller in diameter than the interior diameter of the casing, an upwardly projecting boss on the base member, a recess in said inertia member, and a coil spring centered on said boss and extending into said recess, whereby the inertia member is resiliently supported and positioned on said base member and removable therewith on detachment of said base.

5. In a vibration inhibitor for transmission lines, a cylindrical casing member adapted to be attached to a cable span, said casing member having a detachable base member, an inertia member slidably received within said casing and provided with a centrally located recess, a coil spring having one of its ends positioned within said recess, a boss extending upwardly from said base member, said boss being positioned within the other end of said coil spring, said coil spring and inertia member beng removable as a unit on and with the removal of the detachable base member, and friction-producing means in the form of a mass of relatively small particles disposed in said casing and supported upon said inertia member.

6. In a vibration inhibitor for transmission lines, a cylindrical casing member adapted to be attached to a cable span, said casing member having a detachable base member, an inertia member supporting friction-producing means slidably received within said casing and provided with a centrally located recess, a coil spring having one of its ends positioned within said recess, a boss extending upwardly from said base member, said boss being positioned within the other end of said coil spring, said coil spring and inertia member being removable as a unit on and with the removal of the detachable base member.

7. In a vibration inhibitor for transmission lines, a cylindrical casing adapted to be attached to a cable span, said casing having a detachable base member, an inertia member slidably mounted within said casing and spaced from the wall of said casing to provide a frictional passage for air contained within said casing, and a yieldable element disposed between said detachable base and inertia member, said inertia member, yieldable element, and base being removable from the casing as a unit.

8. In a vibration inhibitor for transmission lines, a cylindrical casing member adapted to be attached to a cable span, said casing member having a detachable base member, a member attached to said base interiorly of said casing and providing an inclined surface, an inertia member mounted in frictional contact with said inclined surface, and a yieldable means for supporting said inertia member on said inclined surface.

ROBERT A. MONROE.